United States Patent
Borgna et al.

(10) Patent No.: US 8,113,527 B2
(45) Date of Patent: Feb. 14, 2012

(54) CROSS-MEMBER FOR A TWIST-BEAM AXLE REAR SUSPENSION FOR A MOTOR VEHICLE

(75) Inventors: Guido Borgna, Turin (IT); Armando D'Aponte, Alessandria (IT); Piero Monchiero, Turin (IT); Andrea Santini, Collegno (IT)

(73) Assignee: Sistemi Sospensioni S.p.A., Corbetta (Milan) (IT)

( * ) Notice: Subject to any disclaimer, the term of this patent is extended or adjusted under 35 U.S.C. 154(b) by 0 days.

(21) Appl. No.: 12/746,854

(22) PCT Filed: Dec. 18, 2008

(86) PCT No.: PCT/IB2008/055416
§ 371 (c)(1),
(2), (4) Date: Oct. 15, 2010

(87) PCT Pub. No.: WO2009/083883
PCT Pub. Date: Jul. 9, 2009

(65) Prior Publication Data
US 2010/0264614 A1   Oct. 21, 2010

(30) Foreign Application Priority Data
Dec. 27, 2007   (IT) .............................. TO2007A0941

(51) Int. Cl.
*B60G 11/18* (2006.01)
(52) U.S. Cl. .......................... 280/124.166; 280/124.128
(58) Field of Classification Search ........... 280/124.128, 280/124.166, 781; 180/311; 301/124.1, 301/129
See application file for complete search history.

(56) References Cited

FOREIGN PATENT DOCUMENTS
DE   10 2004 003 152 A1   8/2005
EP   1 454 776 A2   9/2004
WO   2006/096980 A1   9/2006

*Primary Examiner* — Eric Culbreth
(74) *Attorney, Agent, or Firm* — Sughrue Mion, PLLC

(57) ABSTRACT

The cross-member (12) comprises first and second beam elements (20, 22) having an open cross-section and firmly secured to each other so as to enclose a closed cross-section chamber (32) having such shape and sizes as to provide the cross-member (12) with the desired torsional stiffness. A free edge (20a) of the first beam element (20) is firmly secured to the outer surface of an intermediate portion (22c) of the second beam element (22) and a free edge (22a) of the second beam element (22) is firmly secured to the inner surface of an intermediate portion (20b) of the first beam element (20). The two beam elements (20, 22) are advantageously made as stamped sheet metal pieces.

7 Claims, 4 Drawing Sheets

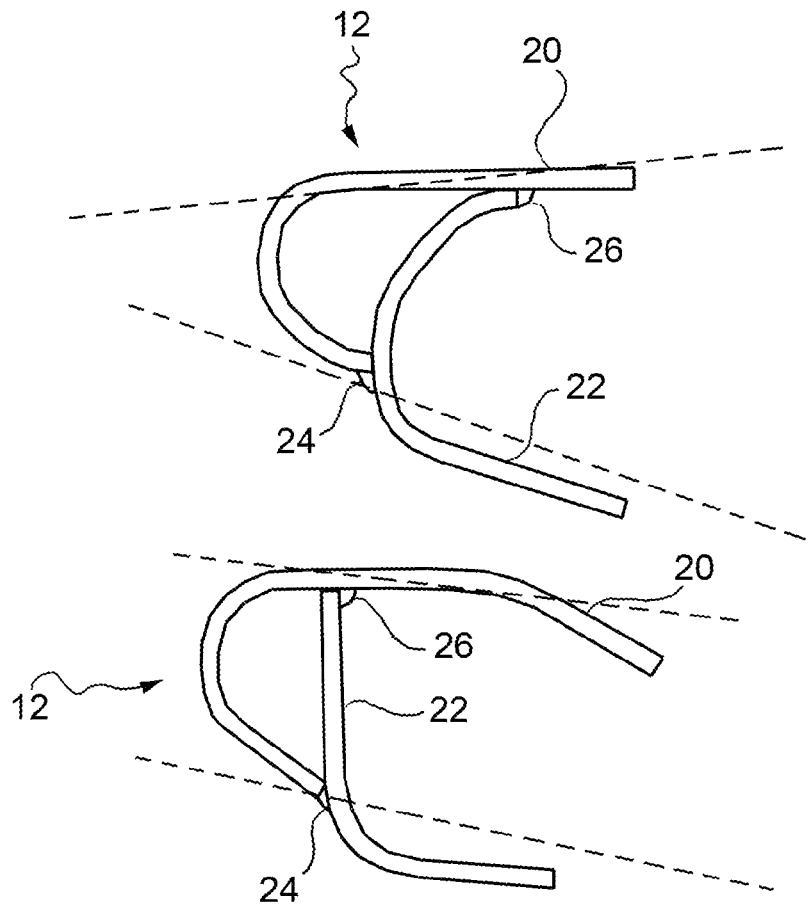
FIG. 3E
FIG. 3F
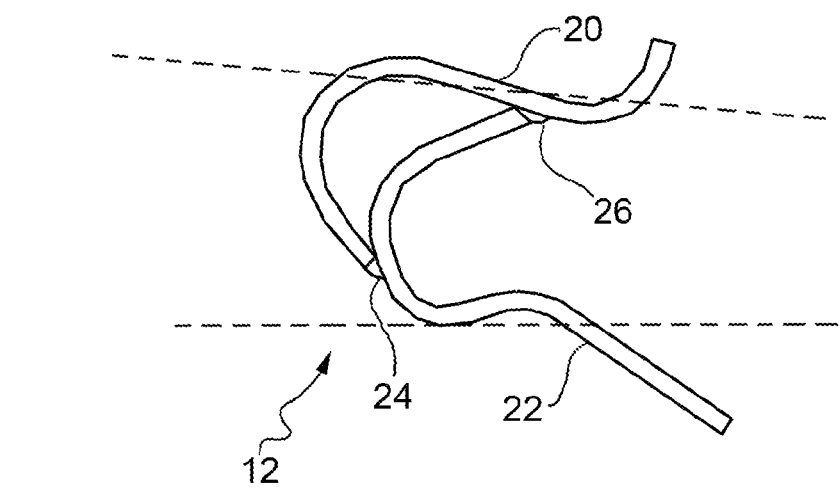
FIG. 3G

CROSS-MEMBER FOR A TWIST-BEAM AXLE REAR SUSPENSION FOR A MOTOR VEHICLE

CROSS REFERENCE TO RELATED APPLICATIONS

This application is a National Stage of International Application No. PCT/IB2008/055416 filed Dec. 18, 2008, claiming priority based on Italian Patent Application No. TO2007A000941, filed Dec. 27, 2007, the contents of all of which are incorporated herein by reference in their entirety.

The present invention relates to a cross-member per a twist-beam axle rear suspension for a motor vehicle.

Twist-beam axle rear suspensions for motor vehicles are known which basically comprise a central cross-member and a pair of trailing arms which are rigidly connected to the opposite side ends of the cross-member and carry elements for support of the rear wheel axles and elements for connection to the vehicle body. While the trailing arms can be regarded as infinitely rigid components, in that they are subject to negligible deformations in normal load conditions, the cross-member must have a certain capacity of deformation, in particular under torsion, to make it possible for the trailing arms to rotate elastically relative to each other.

Since the length of the cross-member is basically imposed by the specific application, as it is linked to the vehicle tread, the torsional stiffness of the cross-member can be changed to take a given value only by way of a proper shaping of the cross-section thereof. In this connection, the cross-members currently used in twist-beam rear suspensions for motor vehicles can be classified into two distinct categories. On the one hand there are cross-members which have an open cross-section and consist in sheet metal beams which are generally obtained by stamping or other methods of plastic deformation and have an open cross-section with outlines of different shapes, generally C-, U-, V- or Ω-like shapes. On the other hand there are cross-members which have a closed cross-section and consist in metal tubular beams which are plastically deformed, for instance by hydroforming, to assume a cross-section of a predetermined shape such as to provide the beam with the desired characteristics in terms of torsional stiffness.

The first category of cross-members mentioned above has the advantage of being easy to produce and therefore of having a low cost, but on the other hand it suffers from the shortcoming of not making it possible to achieve the values of torsional stiffness normally required. In order to compensate for the low torsional stiffness of an open cross-section beam, a torsion bar is usually added which is typically formed by a metal tubular element which may be equally well solid or hollow and is securely connected at its opposite ends to the two trailing arms. By virtue of the use of a torsion bar acting in parallel to the open cross-section beam, a cross-member is achieved the overall torsional stiffness of which is the sum of the torsional stiffness of the open cross-section beam and of the torsion bar. By properly designing the torsion bar it is therefore possible to achieve the torsional stiffness required to the cross-member. However, the torsion bar is an expensive component and therefore its use heavily affects the overall cost of the cross-member.

On the other hand, the second category of cross-members mentioned above has the advantage of allowing to achieve high stiffness values without requiring to add a torsion bar. However, also this solution clearly has a higher cost than a simple open cross-section beam.

International patent application WO2006/096980 discloses a cross-member for a twist-beam axle rear suspension for a motor vehicle which comprises a first sheet metal beam element having an open cross-section in the shape of an overturned U and a second beam element which also has an open cross-section and is rigidly connected to the first beam element to form with this latter a closed cross-section chamber which is suitably shaped to provide the cross-member with the required torsional stiffness. Since a portion of cross-member having a closed cross-section is obtained by joining two open cross-section beam elements, the overall torsional stiffness of the cross-member can then be increased with respect to a cross-member consisting only in the first beam element having an open cross-section in the shape of an overturned U, in a similar manner as it could be obtained by adding a torsion bar, but at a significantly lower cost.

A similar cross-member for a twist-beam axle rear suspension for a motor vehicle is known from European patent application EP1454776.

It is an object of the present invention to provide a cross-member for a twist-beam axle rear suspension for a motor vehicle, which makes it possible to set the torsional stiffness and the position of the axis of rotation of the cross-member in a controlled manner, but which has a lower cost than the known solutions discussed above.

This and other objects are fully achieved according to the invention by virtue of a cross-member having the features defined in the following specification.

In short, the invention is based on the idea of providing a cross-member consisting in a pair of open across-section sheet-metal beam elements which are suitably shaped and secured to each other so as to enclose a closed cross-section chamber of such shape and sizes as to provide the cross-member with the desired torsional stiffness, wherein a free edge of the first beam element is welded to the inner surface of an intermediate portion of the second beam element and a free edge of the second beam element is welded to the outer surface of an intermediate portion of the first beam element.

The geometry of the two beam elements, as well as the way of joining the same, may be suitably varied to obtain a closed chamber having shape and sizes such that they provide the cross-member with the desired torsional stiffness. Since the cross-member is split into two open cross-section beam elements, cross-members with even complex outlines can be produced easily and cheaply and the shear centres thereof can be accurately defined. This makes it possible to arrange the transverse axes of rotation of the twist-beam axle in positions that otherwise would not be easily obtainable with conventional cross-members, two to the need to produce outlines having undercut portions.

The two beam elements may of course have different thicknesses in order to obtain a reduction in the cost and weight of the cross-member with the same performances. Moreover, the cross-section of the cross-member may be oriented as desired in the vertical longitudinal plane of the vehicle, in order to achieve the desired position of the shear centre.

Further features and advantages of the invention will result more clearly from the following detailed description, given purely by way of non-limiting example with reference to the appended drawings, in which:

FIGS. 3A to 3G show several possible examples of a cross-section of a cross-member according to the invention.

In the description and the claims which follow, terms such as "longitudinal" and "transverse", "inner" and "outer", "front" and "rear", "upper" and "lower" etc. are to be intended as referred to the mounted condition of the cross-member on a motor vehicle.

It is however clear that the use of a cross-member according to the invention is not limited to a motor vehicle as described and illustrated here below, but can be applied in several other fields, in particular in all those cases where it is necessary to have a low-cost beam which enables to obtain a wide range of values of torsional stiffness with few and simple modifications.

Figure 1:
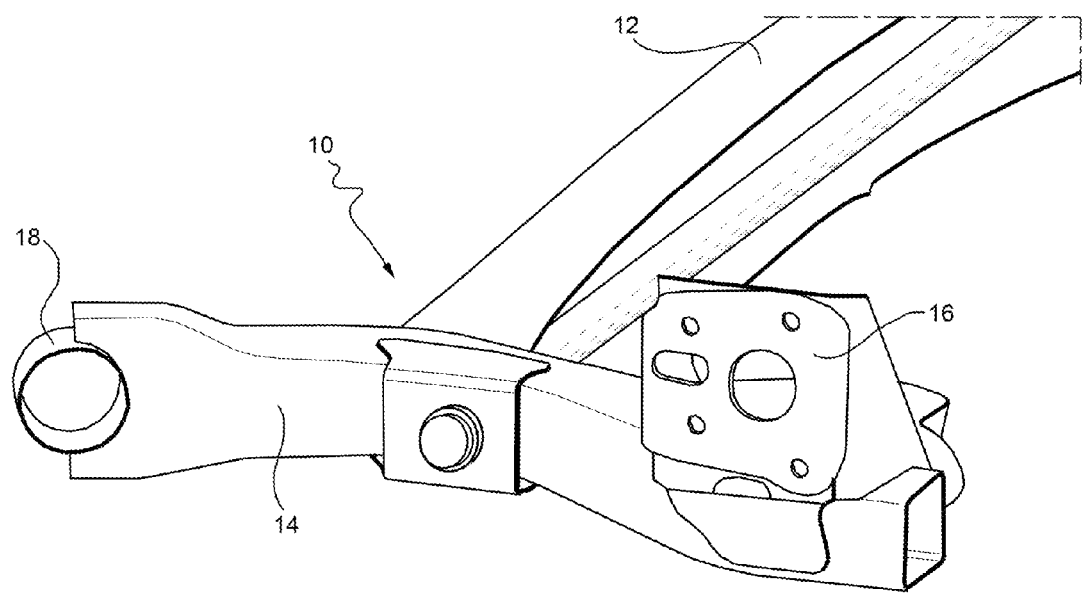
FIG. 1 is a perspective view of a side end portion of a twist-beam axle for a rear suspension of a motor vehicle having a cross-member according to a preferred embodiment of the invention.

With reference first to FIG. 1, a twist-beam axle for a rear suspension of a motor vehicle is generally indicated 10 and comprises a central cross-member 12 which can be deformed under torsion in a controlled manner and a pair of trailing arms 14 (only one of which is illustrated in FIG. 1) rigidly connected each to a respective side end of the cross-member 12. The trailing arms 14 carry support elements 16 for the rear wheel axles of the vehicle (not shown) and attachment elements 18 (in the illustrated example, a simple bush seating) for articulated connection of the twist-beam axle 10 to the vehicle body (also not illustrated).

Figure 2:
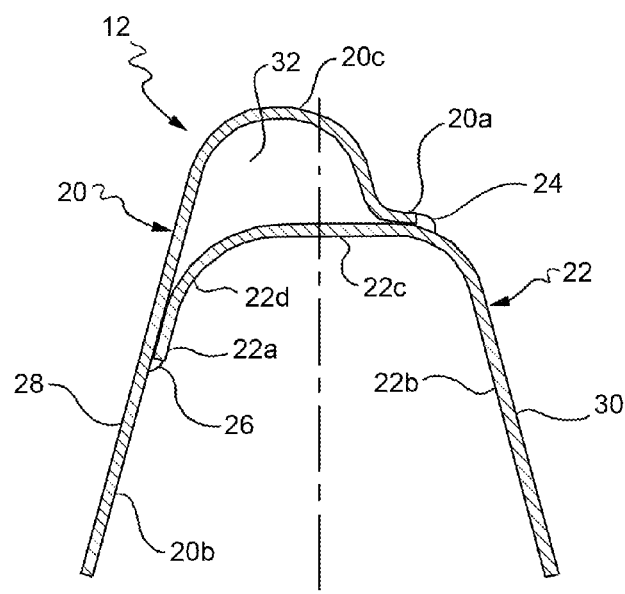
FIG. 2 is a cross-section of the cross-member of the twist-beam axle of FIG. 1.
Figure 3A:
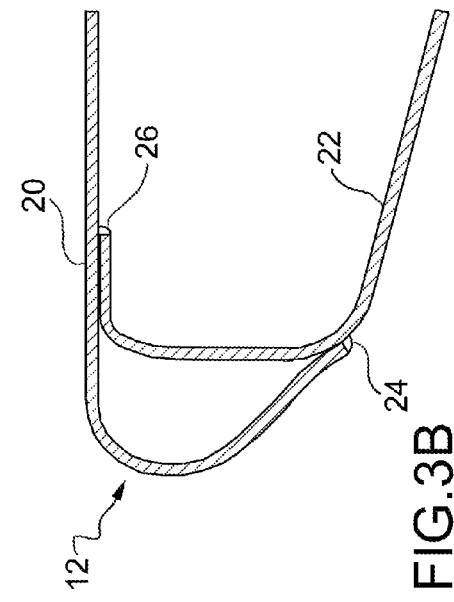
Figure 3B:
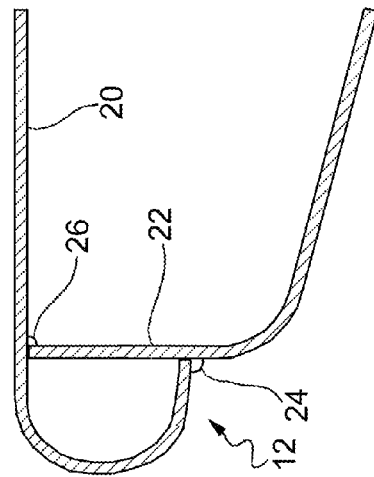
Figure 3C:
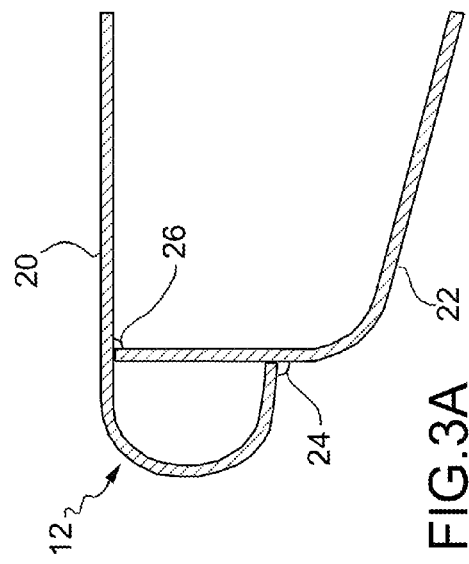
Figure 3D:
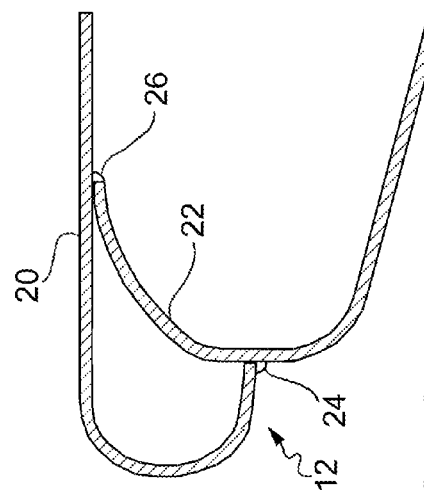
Figure 4A:
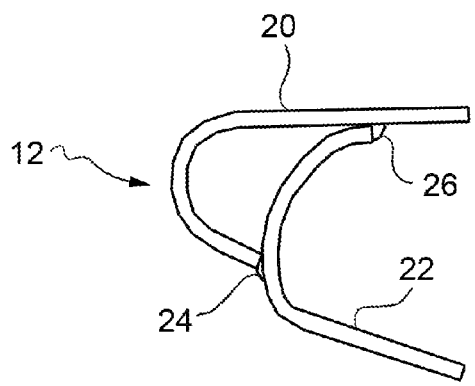
FIGS. 4A to 4D show several possible orientations of the cross-section of the cross-member according to FIG. 3C in the longitudinal plane of the vehicle.
Figure 4B:
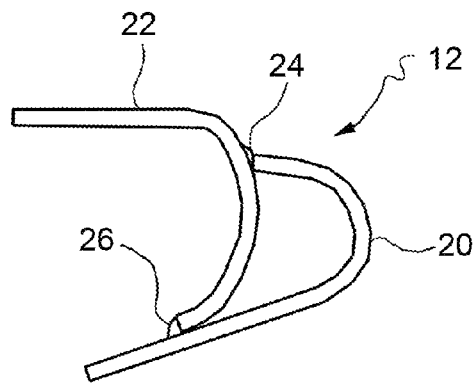
Figure 4C:
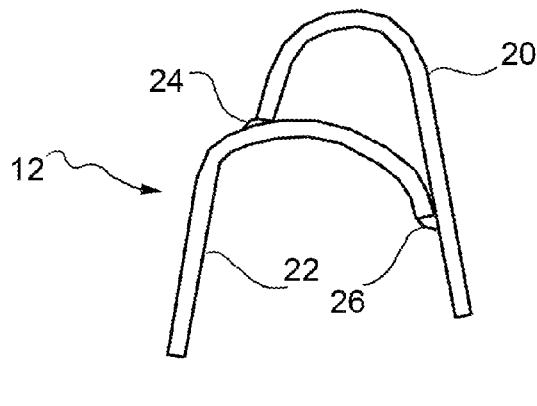
Figure 4D:
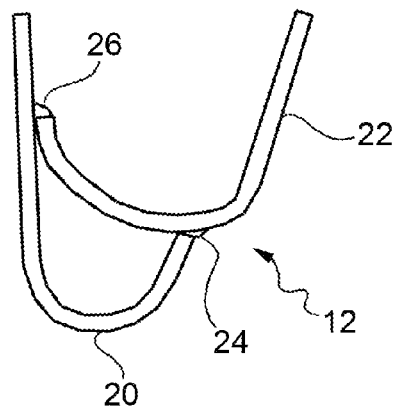

With reference in particular to FIG. 2, the cross-member 12 basically consists in first and second beam elements 20 and 22, both made as open cross-section sheet metal pieces obtained by stamping or other methods of plastic deformation. The two beam elements 20 and 22 are rigidly connected to each other by means of a pair of welded joints 24 and 26. More specifically, a free edge 20a of the first beam element 20 is welded (joint 24) to the outer surface of an intermediate portion of the second beam element 22, while a free edge 22a of the second beam element 22 is welded (joint 26) to the inner surface of an intermediate portion of the first beam element 20.

In the embodiment of FIG. 2, the cross-member 12 includes first and second legs 28 and 30 formed by a flat wall portion 20b of the first beam element 20 and by a flat wall portion 22b of the second beam element 22, respectively, and a closed cross-section chamber 32 defined at its upper end by a curved wall portion 20c and by an upper part of the flat wall portion 20b of the first beam element 20 and at its lower end by a flat wall portion 22c of the second beam element 22 adjacent to the flat wall portion 22b and by a curved wall portion 22d of the second beam element 22 adjacent to the flat wall portion 22c. In this case, the welded joint 24 is made between the free end of the curved wall portion 22d of the second beam element 22 and an intermediate point on the inner surface of the flat wall portion 20b of the first beam element 20 defining the first leg 28, while the welded joint 26 is made between the free end of the curved wall portion 20c of the first beam element 20 and a point on the outer surface of the flat wall portion 22c of the second beam element 22.

FIGS. 3A to 3G show a series of possible examples of shape of the cross-section of the cross-member 12. All the proposed examples share the idea of rigidly connecting the two beam elements by means of a first joint provided between a free edge of the first beam element and the outer surface of an intermediate portion of the second beam element and a second joint provided between a free edge of the second beam element and the inner surface of an intermediate portion of the first beam element. This common idea remaining unchanged, the proposed examples have different shapes which are designed to obtain predetermined stiffness characteristics, both in terms of torsional stiffness value and in terms of position of the shear centre of the cross-member, in other words in terms of position of the transverse axis of rotation about which the two trailing arms of the twist-beam axle rear suspension connected through the cross-member rotate.

FIGS. 4A to 4D put in evidence how the cross-section of the cross-member may be variously orientated in the longitudinal plane of the vehicle, once its shape (in this case a shape corresponding to that illustrated in FIG. 3C) has been established. The illustrated examples show four different orientations rotated 90 degrees to each other.

The torsional stiffness of the cross-member may also be adjusted by properly selecting materials and thicknesses of the two beam elements. The second beam element might be made for instance of a different material from that of the first. Moreover, one or both of the beam elements might be made of a non-metal material, for instance of carbon fibre.

As far as the joining between the two beam elements, methods other than welding may even be used, such as for instance gluing or riveting.

Naturally, the principle of the invention remaining unchanged, the embodiments and details of construction may be widely varied with respect to those described and illustrated purely by way of non-limiting example.

The invention claimed is:

1. Cross-member (12) for a twist-beam axle rear suspension (10) for a motor vehicle, comprising first and second beam elements (20, 22) which have an open cross-section and are firmly secured to each other so as to enclose a closed cross-section chamber (32) having such shape and sizes as to provide the cross-member (12) with the desired torsional stiffness, wherein a free edge (20a) of the first beam element (20) is firmly secured to the outer surface of an intermediate portion (22c) of the second beam element (22) and a free edge (22a) of the second beam element (22) is firmly secured to the inner surface of an intermediate portion (20b) of the first beam element (20).

2. Cross-member according to claim 1, wherein one of said first and second beam element (20, 22) is made of sheet metal.

3. Cross-member according to claim 2, wherein the other of said first and second beam elements (20, 22) is made of carbon fibre.

4. Cross-member according to claim 1, wherein both the beam elements (20, 22) are made of sheet metal.

5. Cross-member according to claim 4, wherein the first and second beam elements (20, 22) are obtained by stamping.

6. Cross-member according to claim 1, wherein said first and second beam elements (20, 22) are secured to each other by welding, gluing or riveting.

7. Twist-beam axle rear suspension for a motor vehicle comprising a cross-member (12) according to claim 1 and a pair of trailing arms (14) mounted onto the opposite ends of the cross-member (12).

* * * * *